July 13, 1954 R. J. S. PIGOTT 2,683,303
CUTTING FLUID JET MOUNT FOR MACHINE CUTTING TOOLS
Filed March 10, 1952 3 Sheets-Sheet 1

INVENTOR.
R. J. S. PIGOTT
BY
A. M. Huyghton
HIS ATTORNEY

July 13, 1954  R. J. S. PIGOTT  2,683,303
CUTTING FLUID JET MOUNT FOR MACHINE CUTTING TOOLS
Filed March 10, 1952  3 Sheets-Sheet 2

INVENTOR.
R. J. S. PIGOTT
BY
HIS ATTORNEY

July 13, 1954  R. J. S. PIGOTT  2,683,303
CUTTING FLUID JET MOUNT FOR MACHINE CUTTING TOOLS
Filed March 10, 1952  3 Sheets-Sheet 3

INVENTOR.
R. J. S. PIGOTT
BY
*A. M. Houghton*
HIS ATTORNEY

Patented July 13, 1954

2,683,303

UNITED STATES PATENT OFFICE 2,683,303

CUTTING FLUID JET MOUNT FOR MACHINE CUTTING TOOLS

Reginald J. S. Pigott, Pittsburgh, Pa., assignor to Gulf Research & Development Company, Pittsburgh, Pa., a corporation of Delaware Application March 10, 1952, Serial No. 275,751

10 Claims. (Cl. 29—106)

This invention relates to a cutting fluid jet mount for machine cutting tools. More particularly, it comprises a device which rigidly abuts the tool and which extends into the working relief angle thereof, the mount being formed with orifices which direct small high speed jets of cutting fluid from behind the point of cut toward the cutting edge without deviation or change of position relative to the cutting edge, regardless of movement of the tool in operation. The jet mount is thus, in effect, a part of the tool itself, requiring no external means for support.

In my Patent No. 2,653,517, there is disclosed a novel system for applying cutting fluids in the form of small high speed jets which are directed to the point of cut from beneath the tool where they will not be obstructed by the continuously removed chip which, in conventional systems employing an overhead stream, deflects the fluid and so prevents its access to the highly heated cutting edge. The effective lubrication of the cutting edge and more efficient cooling of the tool which are achieved by my aforesaid system greatly prolong tool life, but since the cutting fluid must be placed close to the edge of the tool where clearance is so small as to be of the order of .00001 to .000001 inch it will be appreciated that the accurate placement of the jets is important to the attainment of the desired result.

In my aforesaid application the system is shown as applied to a lathe, with the jet nozzle mounted on the carriage adjacent the tool post so that the jet is directed upwardly from underneath the tool to the point of cut. In such construction the nozzle and tool have a fixed relationship since both are mounted on the carriage, but in some machine tools no external support is provided for a jet nozzle and in others the tool rotates or is indexed from one position to another so that the nozzle cannot be mounted on a support which is fixed, whereas the tool itself is movable. In the Fellows gear shaper, for example, the cutter reciprocates and at the same time is revolved in mesh with the work. Also, in the operation of milling cutters, rotation of the tool presents a problem of accurately jetting the cutting fluid to the edges of the teeth.

The present invention solves the aforesaid problems and has as its achieved object to provide a fluid jet mount for metal working tools wherein the nozzle or similar device for discharging the jets is carried in fixed relation to the cutting edge or edges of the tool so that regardless of indexing or other movement of the tool, high speed jets of the fluids will be accurately and invariably placed close to the cutting edge by being projected along the relief angle of the tool.

Another object of the invention is to provide a fluid jet mount in fixed association with a tool and projecting into the working relief angle thereof without, however, contacting the work as it leaves the point of cut, the projecting portion of the mount being formed with orifices for discharging one or more jets of cutting fluid along the relief angle to accurately place the same adjacent the cutting edge of the tool.

A further object of the invention is to provide a box-type jet mount which conforms in general shape and width to that of a tool and which is secured to the bottom surface of the tool to extend into the working relief angle thereof sufficiently far to expose orifices directed toward the cutting edge, yet to be out of contact with the moving work.

The foregoing and other objects and advantages of this invention will be apparent from the following description and drawings in which, Figure 1 is a sectional view showing the box-type jet mount applied to a tool used in turning operations on a lathe.

Figure 1:
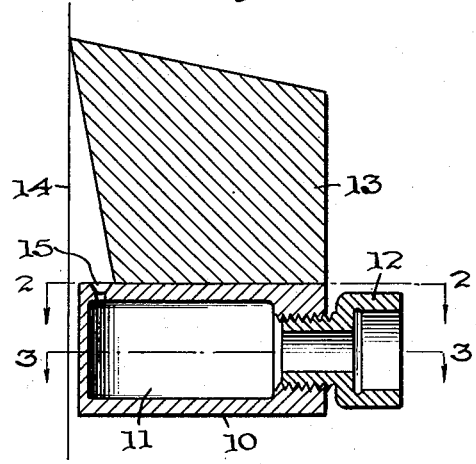

Referring more particularly to the drawings and first to Figure 1 thereof, the jet mount in the form shown comprises a body 10 having a hollowed-out portion 11 defining a closed chamber which is tapped by a nipple 12 for connection to a source of cutting fluid. The body 10 abuts the under surface of tool 13 and overhangs the lower edge of the tool body, as shown in Figure 1 and as indicated in broken lines in Figure 2, but with clearance from the work which has passed the cutting edge, as indicated by the vertical line 14 in Figure 1. Orifices 15 in the overhanging portion of the body 10 communicate with the chamber 11 and direct the cutting fluid in jets which impinge upon the work and tool closely adjacent to the cutting edge. These orifices are spaced from the wall of chamber 11 so as to leave a sharp circumferential shoulder on the approach side and a surrounding flat surface, in order to avoid any suppression of the vena contracta which will change the direction and size of the jet.

Where a half-inch square tool bit is used, the side relief angle from the cutting edge slopes downwardly at approximately 10° from the vertical and accordingly there is a space of about 0.07 inch between the heel of the tool and the moving cut face of the work as it leaves the tool edge. The hollow body 10 is of substantially the same width as the tool bit but is left a very small amount short of touching the cut face of the work; in this case .005 to .010 inch would be ample. The overhang thus provided permits location of the orifices 15 within the relief angle so that the fluid jets are directed to the cutting edge of the tool.

In order to securely hold the tool and jet mount in abutting relation they may conveniently be clamped together in the tool post 16 in the same manner as packing pieces are employed under the tool bit to set it at the proper height for the cut.

Figure 3:
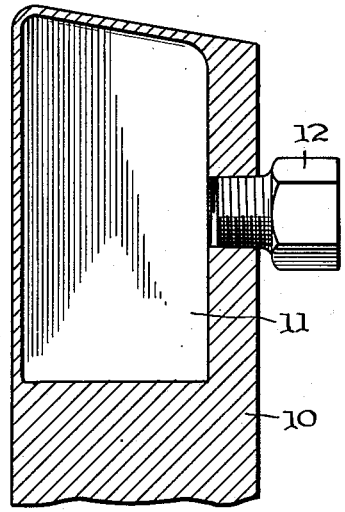
Figure 3 is a horizontal section along line 3—3 of Figure 1.
Figure 2:
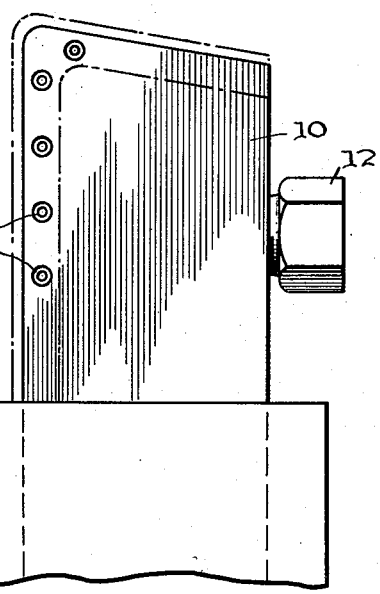
Figure 2 is a plan view of the box-type mount of Figure 1, looking downwardly from the plane of line 2—2 of Figure 1.
Figure 4:
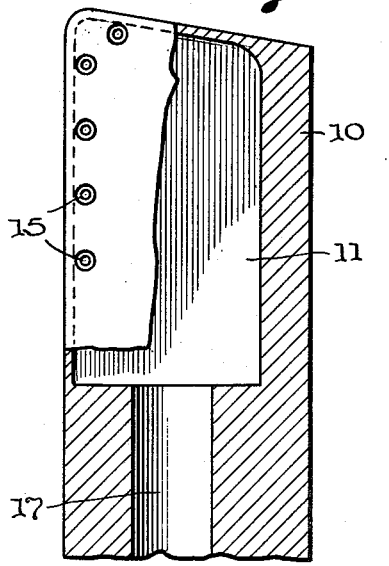
Figure 4 is a plan view partly in horizontal section showing a different arrangement of inlet which extends from the end of the mount rather than its side.

As an alternative to providing a side inlet for the cutting fluid, illustrated in Figures 1 to 3, inclusive, the body of the mount may be formed with a longitudinal bore 17 through which the cutting fluid is supplied to chamber 11, as shown in Figure 4.

Figure 5:
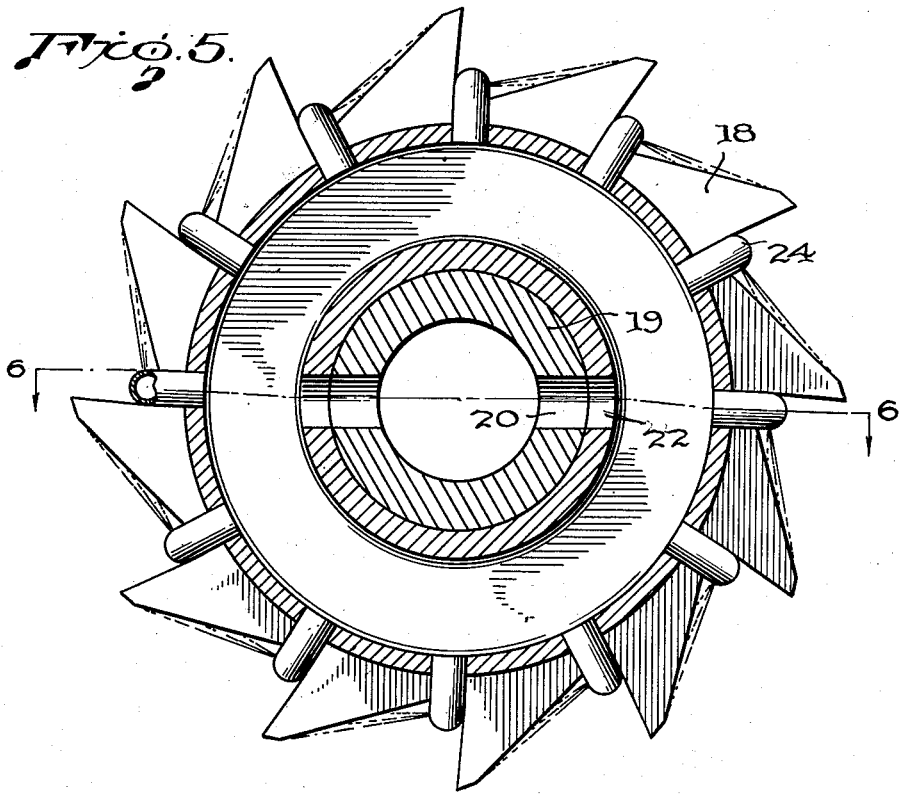
Figure 5 is a side view partly in section along line 5—5 of Figure 6 of a milling cutter with fluid jet mount for discharging jets to the cutting edges of its series of teeth.
Figure 6:
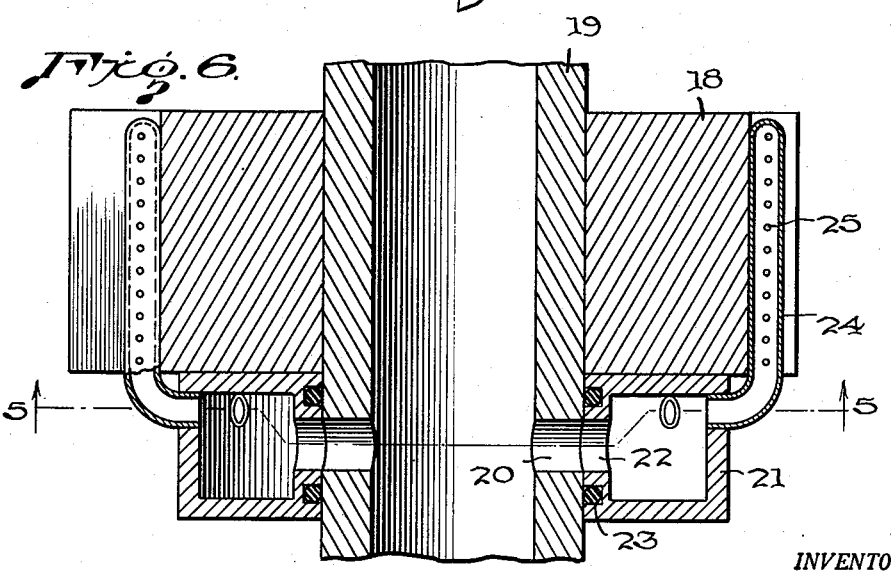
Figure 6 is a sectional view along lines 6—6 of Figure 5.

Another adaptation of the invention is shown in Figures 5 and 6 wherein the cutting fluid is jetted along the relief surfaces of the teeth of a milling cutter. In this form of the invention the cutter 18 is mounted on a hollow shaft 19 which is formed with radial ports 20 communicating with a hollow annular collar 21. The collar 21 has ports 22 in its inner surface registering with the ports 20 in shaft 19. Leakage at the joint between the collar and shaft is prevented by the provision of O-rings 23 which seal the collar to the shaft.

Around the periphery of the collar 21 a plurality of communicating tubes 24 are arranged to extend between adjacent teeth of the abutting milling cutter 18, such tubes being formed with orifices 25 directed to discharge cutting fluid along the sloping surface of the tooth to the cutting edge. Thus, as the milling cutter rotates the jet mount which is secured to it maintains the several jets in the same relation to the cutting edges throughout the rotation of the tool.

Figure 7:
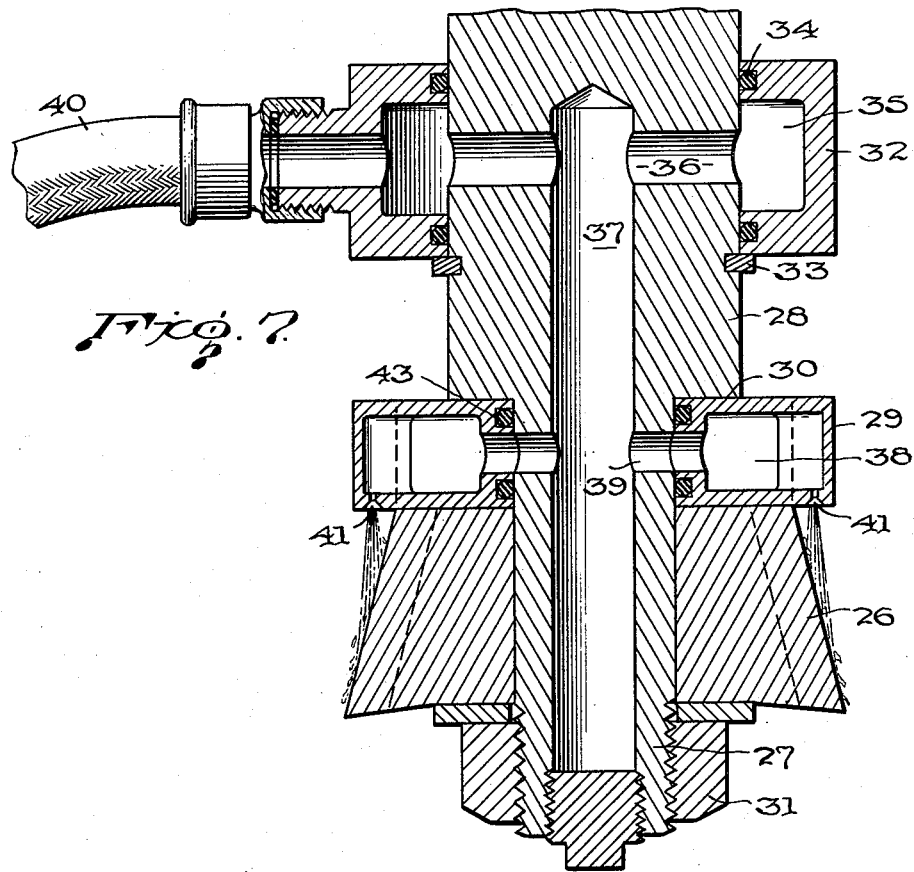
Figure 7 is a vertical sectional view of the invention applied to the cutter of a Fellows gear shaper.
Figure 8:
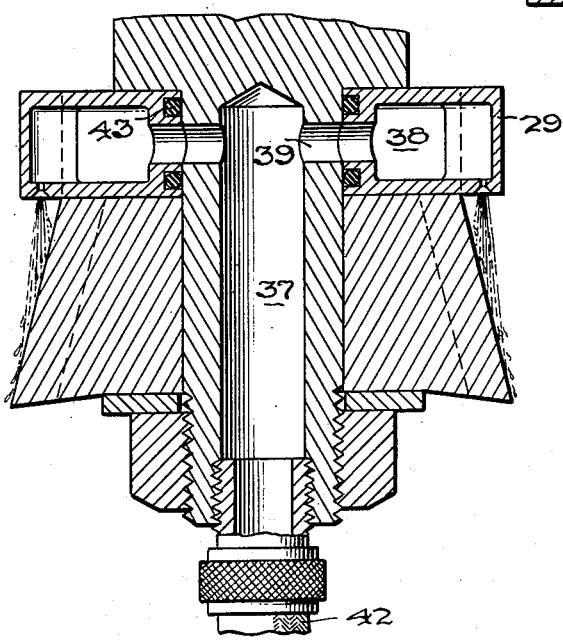
Figure 8 is a vertical sectional view of a modified form of the invention as applied to a Fellows gear shaper, wherein the cutting fluid is supplied axially through the holder rather than from the side as shown in Figure 7.

A further modification and adaptation of the invention is shown in Figures 7 and 8 wherein the jet mount is applied to the cutter of a Fellows gear shaper. As shown in Figure 7, the cutter 26 is mounted upon the reduced end 27 of a holder 28 and secures a hollow collar 29 against a shoulder 30 between the large and reduced portions of the holder. A nut 31 on the threaded, reduced end of the holder secures the cutter and collar in the same relative position which they occupy in reciprocation of the cutter as well as in its revolution in mesh with the gear blank being cut.

In the form of invention shown in Figure 7 the holder is provided with an upper hollow collar 32 which seats upon a ring 33 retained in an annular groove in the holder. O-rings 34 seal the joint between the collar and holder against leakage of fluid while permitting the holder to rotate with respect to the collar. The hollow interior 35 of the collar communicates by radial ports 36 in the holder with an annular passage 37 therein and, in turn, the hollow interior 38 of the jet mount collar communicates with the passage 37 by means of ports or passages 39. Cutting fluid is admitted to the upper collar 32 through a flexible hose 40 and passes successively through the passages 36, 37 and 39 into the hollow interior of the jet mount from which it is discharged through orifices 41 into the working relief angle of the cutter.

As in the first described embodiment of my invention, this box-type jet mount is of a width only slightly less than that of the cutter whereby it provides an overhang at the base of the cutter tooth sufficient to provide for the orifices 41 along its edge, yet not extending so far as to interfere with the passage of the tool through the work piece.

The modification shown in Figure 8 is similar to that above-described in Figure 7 except that, instead of providing a floating collar for admission of the cutting liquid to the holder, in this form of the invention the cutting fluid is supplied from a flexible pipe or flexible hose 42 to the axial bore 37 of the holder from which the fluid flows through lateral passages 36 and 39 into the hollow interior 38 of the jet mount 29, as above described. In order to insure against leakage at the joint between the jet mount and holder both forms of the invention shown in Figures 7 and 8 provide O-rings or other suitable packing 43 in the jet mount to seal the joint.

From the foregoing it will be appreciated that while the cutting fluid jet mount of the present invention is peculiarly adapted for use where the tool rotates or has indexed movement relative to the frame or other fixed portion of the machine which would preclude mounting of a jet nozzle on the fixed frame it is also useful in external turning operations such as are conducted on a lathe since it may be clamped with the tool and firmly held in association with the tool during operation. This assemblage not only has the advantage of compactness but it lessens the distance between the jet orifices and cutting edge of the tool which greatly facilitates accurate placement of the fluid jet or jets in the extremely small clearance between the tool and work in the region of the cutting edge, and by reason of this accurate placement of the jets there is no loss of energy as could be caused by their slight misdirection.

In addition, this form of mount is adapted to applying the jet orifices to a cutting tool or bit mounted in a boring bar for internal turning or boring. It is also adapted to the form of cutting tool support commonly known as a box tool used in automatic and turret lathes.

A further advantage of this type of mount is that since the jet or jets are mounted directly under the wedge-shaped space formed between the relief angle of the tool and the moving work, this wedge-shaped space is completely enclosed when cutting and the possibility of chip interference with the jets is eliminated.

What I claim as my invention is:

1. A cutting fluid jet mount for use with machine cutting tools, comprising a hollow fluid distributor member adapted to be mounted in abutting relation to the tool and to project into the working relief angle thereof between the tool and cut surface of the work, orifices formed in the projecting portion of the distributor member communicating with the hollow interior thereof and directed up the working relief angle from behind the point of cut toward the cutting edge, whereby the jets of cutting fluid are projected to the cutting edge of the tool at substantially a right angle thereto.

2. A cutting fluid jet mount comprising, in combination with a machine cutting tool having a working relief surface which tapers from the cutting edge in a direction to afford clearance between such surface and the portion of the work leaving the point of cut, a jet mount fixed in abutting relation to the tool and lying parallel with the cutting edge, said jet mount extending into the clearance space between the tool and cut surface of the work within the overhang provided by the tapered work relief surface of the tool, said jet mount being formed with orifices directed along such tapered surface of the tool toward the cutting edge.

3. A cutting fluid jet mount comprising a hollow liquid distributor adapted to be fixedly carried by a machine cutting tool and to extend into the wedge-shaped space between the relief surface of the tool and the portion of the work leaving the point of cut, said distributor being formed with orifice means directed toward the cutting edge of the tool to project liquid substantially at a right angle to the cutting edge along the relief surface.

4. A fluid jet mount for cutting tools having a relief surface which tapers from the cutting edge in a direction to afford clearance between such surface and the cut portion of the work, a box-like liquid distributor for mounting in abutment with said tool, said distributor having an outline conforming generally to that of the tool surface which it abuts but being of sufficiently greater width to extend beyond such surface into the clearance space between the working relief surface and the cut portion of the work, said distributor being formed with peripherally arranged orifices which, in its assembled relation with the tool, are exposed beyond the margin of the abutting surface of the tool, said orifices being directed toward the cutting edge.

5. A cutting fluid jet mount comprising, in combination with a cutting tool having a working relief surface tapering inwardly from the edge thereof, away from the work, and defining a working relief angle between the tool and cut portion of the work, a liquid distributor having a flat surface abutting the base surface of said tool and extending therebeyond into the relief angle, said distributor having an internal chamber and marginal orifices extending therefrom into the relief angle closely adjacent the working relief surface of said tool and directed toward the cutting edge.

6. A cutting fluid jet mount comprising, in combination with a cutting tool having a working relief surface tapering from the cutting edge thereof to define a working relief angle between the tool and cut portion of the work, a block of generally similar contour to the base surface of the tool but of greater width than such base surface and projecting into the relief angle with clearance from the cut portion of the work, that portion of the block underlying the cutting edge of the tool being hollow and forming a liquid distributing chamber, inlet means connecting the chamber with a source of cutting fluid, and orifices in the block beyond the margin of the base surface of the tool, said orifices communicating with the chamber and adapted to discharge liquid therefrom in jets directed to the cutting edge of the tool.

7. A cutting fluid jet mount fixedly positioned under the cutting edge of a moving cutting tool, such as a milling cutter, hob, or shaper formed tool, and moving with the tool, comprising a hollow liquid distributor connected to a source of cutting fluid and extending into the wedge-shaped clearance space between the tool and the surface of the work leaving the point of cut, such space being formed by taper of the tool inwardly from its cutting edge, said liquid distributor being fixedly mounted in abutting relation to the tool and formed with orifices communicating with its hollow interior and directed toward the cutting edge substantially at a right angle thereto.

8. A cutting fluid jet mount for machine tools which is adapted to direct small, high speed jets of fluid along the relief angle of the tool in the opposite direction to the movement of the work past the cutting edge of the tool, said jet mount comprising a body abutting the tool in fixed relation to the cutting edge and projecting into the working relief clearance between the tool and work rearwardly of the cutting edge, said body having an internal chamber to which fluid is supplied under pressure, and orifices in said body directed to discharge jets of the fluid from the chamber into the working relief clearance at substantially right angles to the cutting edge, said orifices being so located in the body that on their approach side the wall of the internal chamber defines therewith sharp circumferential shoulders, whereby the vena contracta of each issuing jet is fully formed and the jets are thereby controlled in size and direction for accurate impingement on the cutting edge with minimum splash and dissipation of energy.

9. In combination with a machine tool having a cutting edge and a contiguous surface sloping away from the cutting edge to provide a working relief clearance, a cutting fluid distributor fixedly abutting the tool rearwardly of the cutting edge and lying partly within the overhang of the sloping surface thereof to extend into the clearance between the tool and work, the portion of the distributor so extending into the clearance being provided with orifice means directed along the sloping surface of the tool at substantially right angles to the cutting edge and so disposed that the cutting fluid is jetted into the minimal clearance between the tool and work without substantial energy loss, whereby static pressure on the fluid is maintained at the line of cutting contact between the tool and work.

10. In combination with a machine tool having a cutting edge and a contiguous surface sloping away from the cutting edge to provide a clearance between the tool and a work piece, diverging in the direction of the movement of the work past the tool, a cutting fluid distributor fixedly abutting the tool rearwardly of the cutting edge, said distributor comprising a body having a hollow portion projecting within the overhang of the sloping surface and extending parallel with the cutting edge, such hollow portion being provided with orifices directed to the apex of the angle formed by the tool in cutting contact with the work and substantially at right angles to the cutting edge to project small, high speed jets of fluid into the clearance close to the point of cut with minimum wash along the surfaces of the tool and work, whereby frictional drag on the jets moving in opposition to the work leaving the point of cut and side splash remote from the cutting edge are avoided and maximum energy of the jets is available to drive the fluid into the minimal clearance at the cutting edge.

References Cited in the file of this patent

UNITED STATES PATENTS

| Number | Name | Date |
|---|---|---|
| 160,161 | Clay | Feb. 23, 1875 |
| 354,498 | Kerchove | Dec. 14, 1886 |
| 522,588 | Chouteau | July 10, 1894 |
| 582,081 | Newton | May 4, 1897 |
| 739,866 | Hartness | Sept. 29, 1903 |
| 2,250,349 | Berquist | July 22, 1941 |
| 2,524,232 | Osrud | Oct. 3, 1950 |